(12) United States Patent
Kim et al.

(10) Patent No.: US 7,709,080 B2
(45) Date of Patent: May 4, 2010

(54) DISPLAY DEVICE

(75) Inventors: Yeon-Cu Kim, Asan-si (KR);
Young-Geol Song, Yongin-si (KR);
Yeon-Kyu Moon, Gunpo-si (KR);
Jung-Im Kim, Pohang-si (KR)

(73) Assignee: Samsung Electronics Co., Ltd.,
Suwon-si (KR)

( * ) Notice: Subject to any disclaimer, the term of this patent is extended or adjusted under 35 U.S.C. 154(b) by 453 days.

(21) Appl. No.: 11/690,371

(22) Filed: Mar. 23, 2007

(65) Prior Publication Data

US 2007/0297076 A1 Dec. 27, 2007

(30) Foreign Application Priority Data

Jun. 23, 2006 (KR) .................... 10-2006-0057096

(51) Int. Cl.
*B41M 5/00* (2006.01)
*B44C 1/17* (2006.01)
*G03G 7/00* (2006.01)
(52) U.S. Cl. .................................. 428/195.1; 359/894
(58) Field of Classification Search .............. 428/195.1; 359/894
See application file for complete search history.

(56) References Cited

U.S. PATENT DOCUMENTS

| 5,963,288 | A  | * | 10/1999 | Sato et al. ................... 349/154 |
| 2004/0114093 | A1 | * | 6/2004 | Liao et al. ................... 349/187 |
| 2005/0110937 | A1 | * | 5/2005 | Yoon et al. .................. 349/153 |
| 2008/0012479 | A1 | * | 1/2008 | Yoo et al. ................... 313/505 |
| 2008/0018245 | A1 | * | 1/2008 | Kim et al. ................... 313/512 |

FOREIGN PATENT DOCUMENTS

| JP | 05-341296 | 12/1993 |
| JP | 2005-215490 | 8/2005 |
| KR | 10-2002-0058554 | 7/2002 |
| KR | 10-2006-0017628 | 2/2006 |
| WO | WO 2004108790 A1 * | 12/2004 |

* cited by examiner

*Primary Examiner*—David R Sample
*Assistant Examiner*—Tahseen Khan
(74) *Attorney, Agent, or Firm*—H.C. Park & Associates, PLC

(57) ABSTRACT

Disclosed is a display device. The display device includes first and second substrates facing each other, a sealant pattern including a first compound attaching the first and the second substrates together, and a separator pattern within the sealant pattern. The separator pattern includes a second compound chemically reacting with the first compound to block the diffusion of the first compound.

14 Claims, 14 Drawing Sheets

Fig. 1
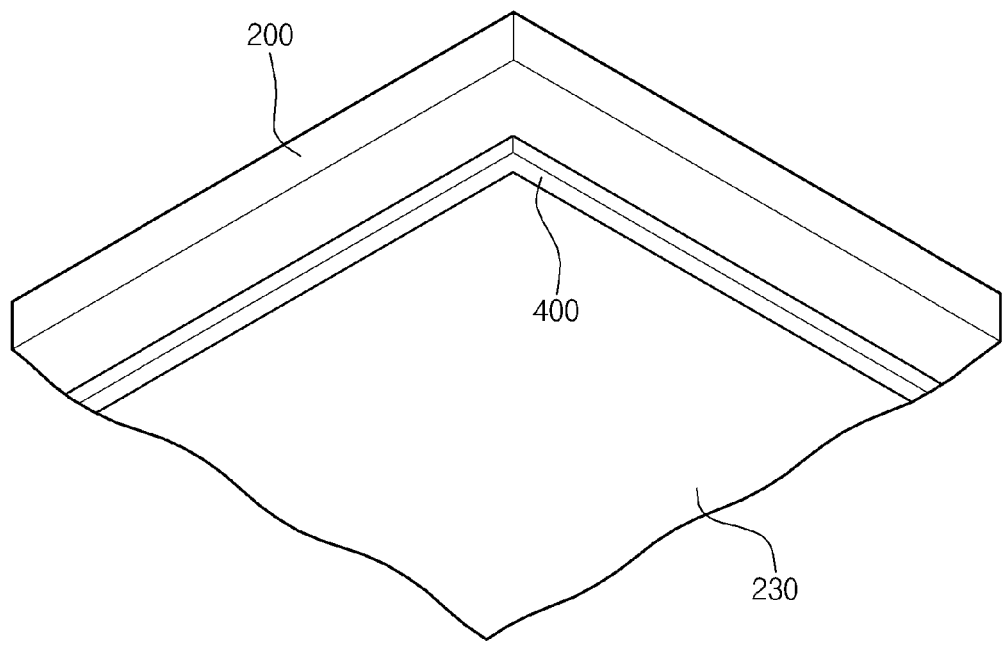
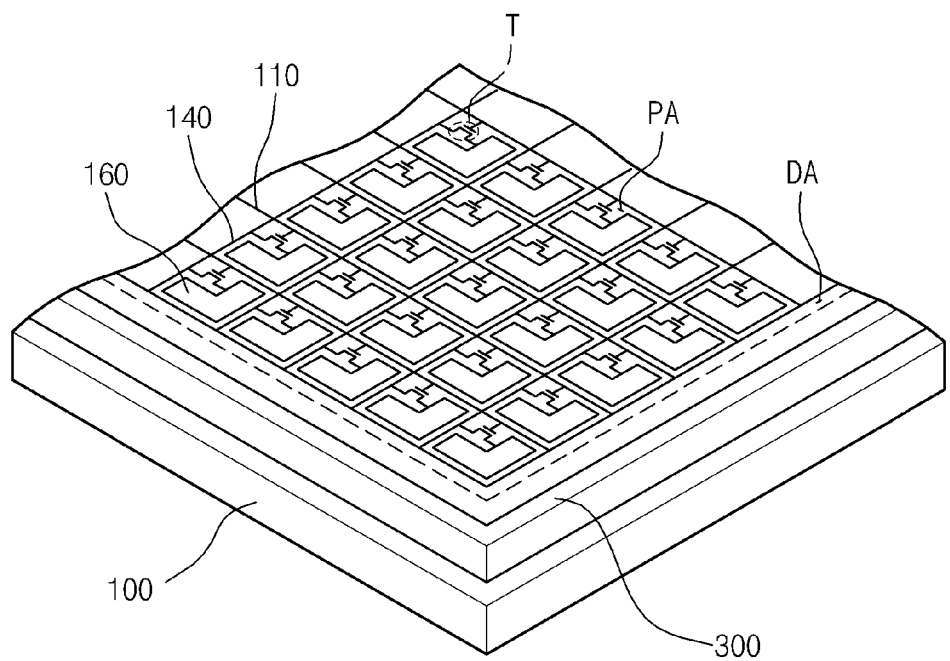

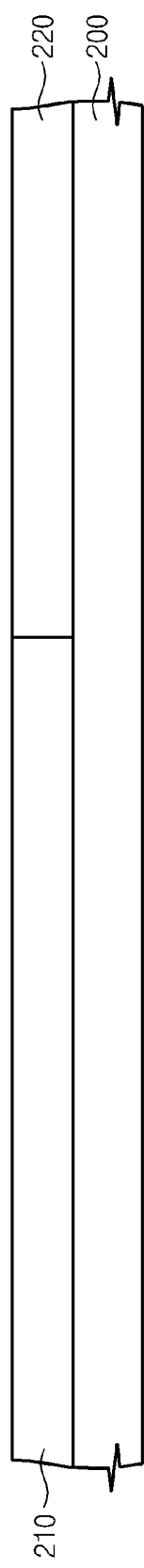

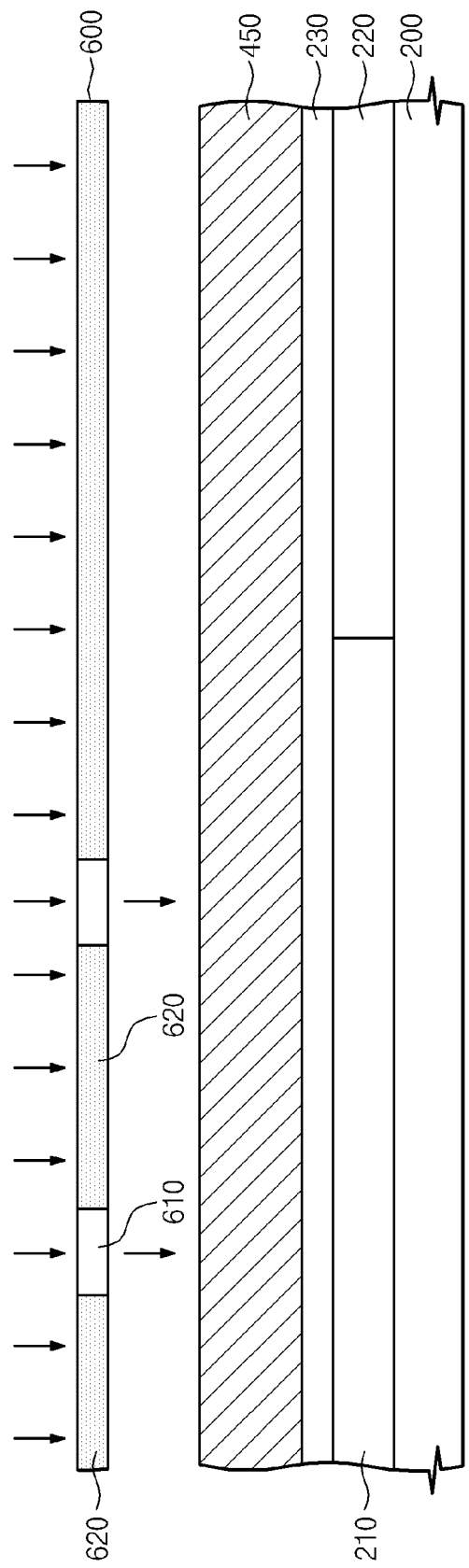

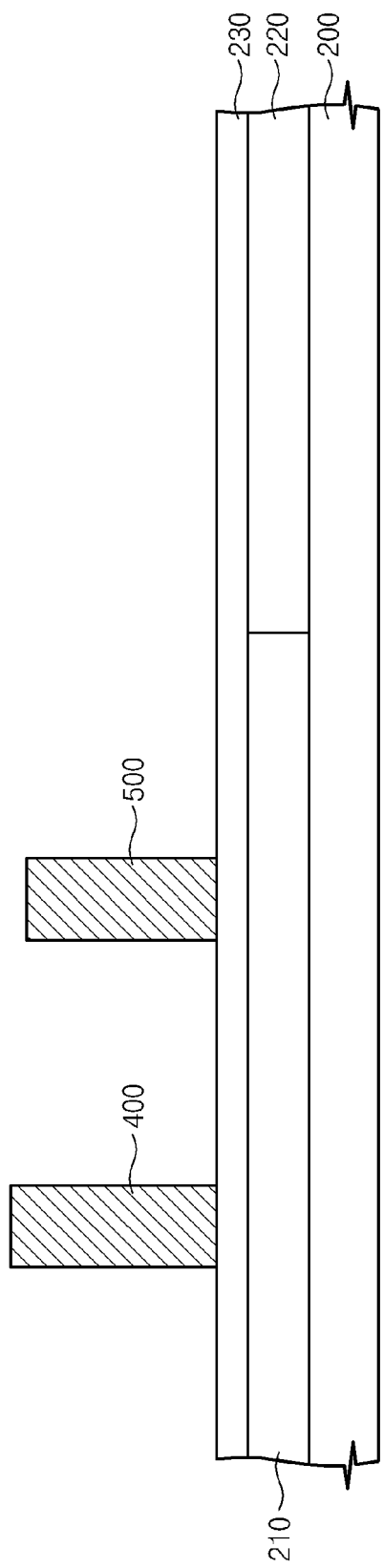

DISPLAY DEVICE

CROSS-REFERENCE TO RELATED APPLICATION

This application claims priority from and the benefit of Korean Patent Application No. 2006-57096, filed on Jun. 23, 2006, which is herein incorporated by reference for all purposes as if fully set forth herein.

BACKGROUND OF THE INVENTION

1. Field of the Invention

The present invention relates to a display device. More particularly, the present invention relates to a display device that may prevent the image quality from being degraded due to contamination.

2. Discussion of the Background

Recent display devices include the liquid crystal display device, plasma display device, organic electroluminescence display device, and the like. These display devices are applied in various devices, such as big screen TVs, notebook computers, and cellular phones.

The above-described display devices include a pair of substrates facing each other. For example, a liquid crystal display device includes two substrates facing each other and a liquid crystal layer provided therebetween. An electric field is applied to the liquid crystals of the liquid crystal layer, and the arrangement of the liquid crystals changes according to the application of the electric field to display the corresponding images.

The region where the image is displayed is defined as a display area, which includes the center portion of the two substrates. A sealant pattern is formed at the edge portion to attach the two substrates together.

The sealant pattern may be formed using a compound including polymer resin. However, while the two substrates are being attached together, the compound included in the sealant pattern may diffuse into the display area. This may contaminate the display area, thereby deteriorating the quality of the image of the display device.

SUMMARY OF THE INVENTION

This invention provides a display device that may maintain a high quality image by preventing contamination of a display area.

Additional features of the invention will be set forth in the description which follows, and in part will be apparent from the description, or may be learned by practice of the invention.

The present invention discloses, a display device including a first substrate including a display area, a second substrate facing the first substrate, a sealant pattern arranged on one of the first substrate and the second substrate and outside the display area, the sealant pattern including a first compound, and a separator pattern arranged on one of the first substrate and the second substrate and between the sealant pattern and the display area, the separator pattern including a second compound to chemically react with the first compound to prevent diffusion of the first compound into the display area.

It is to be understood that both the foregoing general description and the following detailed description are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this specification, illustrate embodiments of the invention, and together with the description serve to explain the principles of the invention.

FIG. 1 is an exploded perspective view of a liquid crystal display device according to an exemplary embodiment of the present invention.

FIG. 6A, FIG. 6B, FIG. 6C, FIG. 6D, FIG. 6E, and FIG. 6F are cross-sectional views showing a manufacturing process of the liquid crystal display device of FIG. 3.

DETAILED DESCRIPTION OF THE ILLUSTRATED EMBODIMENTS

Figure 2:
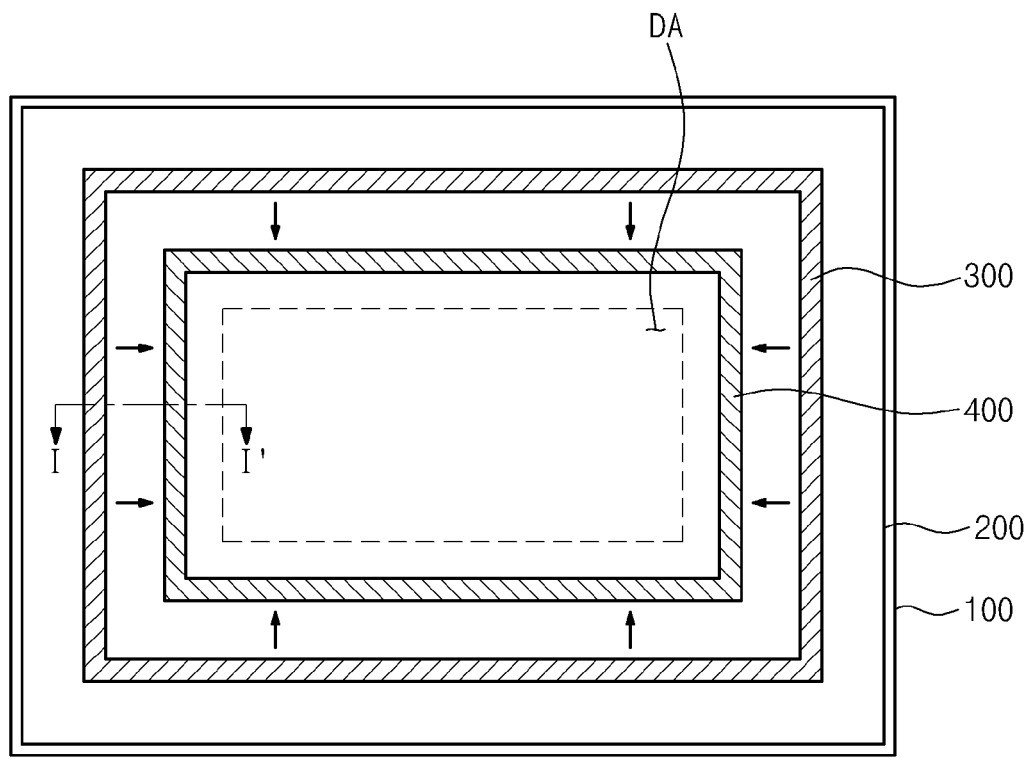
FIG. 2 is a schematic planar view of FIG. 1.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

FIG. 1 is an exploded perspective view of a liquid crystal display device according to an exemplary embodiment of the present invention.

Referring to FIG. 1, the device includes a first substrate 100 and a second substrate 200 facing each other, and liquid crystals (not shown) provided between the first substrate 100 and the second substrate 200. A display area DA, in which an image is displayed, is defined on the first substrate 100. The display area DA includes the center portion of the first substrate 100 and excludes the edge portion of the first substrate 100.

A plurality of gate lines 110 and a plurality of data lines 140 are formed on the first substrate 100 and define a pixel area PA. The pixel area PA represents a single unit that is used to display the image. Each pixel area PA has the same structure.

Each pixel area PA includes a pixel electrode 160 and a thin film transistor T. The thin film transistor T includes a gate electrode, a source electrode, and a drain electrode, connected to the gate line 110, the data line 140, and the pixel electrode 160, respectively. The second substrate 200 includes a common electrode 230 corresponding to the pixel electrode 160.

During the operation of the liquid crystal display device, a gate on signal is applied to the gate line 110 to turn on the thin film transistor T. In addition, data signals carrying the image information are transmitted through the data line 140 and applied to the pixel electrode 160, and a common voltage is applied to the common electrode 230. An electric field according to the voltage difference between the pixel electrode 160 and the common electrode 230 causes a change in the arrangement of the liquid crystals to display an image.

The liquid crystal may be exposed to various foreign materials and may be contaminated. When the liquid crystal is contaminated, the quality of the image may deteriorate. One of the contaminants of the liquid crystal may be a sealant pattern 300.

The sealant pattern 300 is formed at the outer portion of the display area DA on the first substrate 100. The sealant pattern 300 also can be formed on the second substrate 200 corresponding to the exterior portion of the display area DA. The sealant pattern 300 includes a resin that may be cured by heat or light. The resin couples the first substrate 100 and the second substrate 200 together. When the sealant pattern 300 is cured, a first compound included in the sealant pattern 300 may diffuse into the display area DA and contaminate the liquid crystal.

In order to prevent contamination of the liquid crystal due to the first compound, a separator pattern 400 may be formed. The separator pattern 400 is formed on one of the first substrate 100 or the second substrate 200. The separator pattern 400 functions as a physical barrier between the sealant pattern 300 and the display area DA to block the movement of the first compound.

The first compound includes an amine-based compound in which a hydrogen atom of ammonia is replaced with a hydrocarbon. The first compound is represented by the chemical formula $NH_2CO(CH_2)_nCON_2H_5$ (in which n represents an integer greater than or equal to 1). Particularly, the first compound is represented by the following structure of chemical formula 1 or chemical formula 2.

<Chemical formula 1>

<Chemical formula 2>

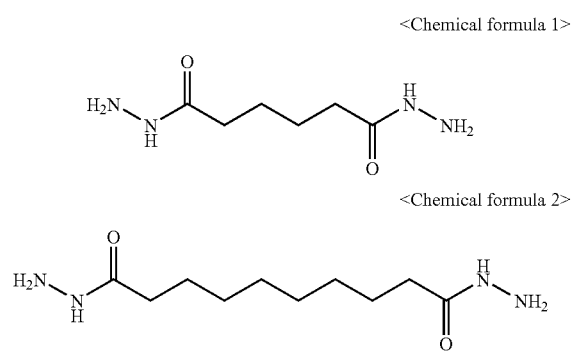

The separator pattern 400 includes a second compound which chemically reacts with the first compound. The second compound includes an epoxy-based compound that may be formed by polymerizing acryl monomers having an epoxide. The chemical reaction concerning the polymerization is represented by the following reaction equation 1.

<Reaction equation 1>

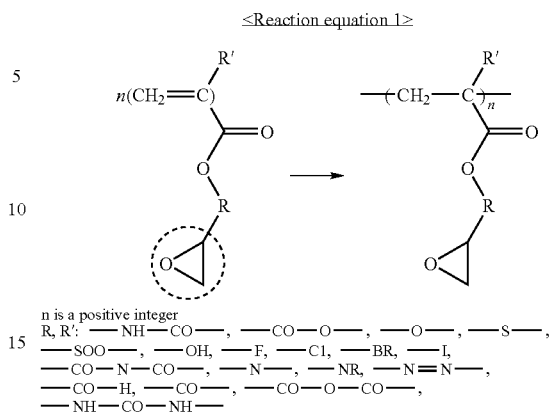

n is a positive integer
R, R': —NH—CO—, —CO—O—, —O—, —S—,
—SOO—, —OH, —F, —Cl, —BR, —I,
—CO—N—CO—, —N—, —NR, —N=N—,
—CO—H, —CO—, —CO—O—CO—,
—NH—CO—NH—

In reaction equation 1, the reactant is an acryl monomer including the epoxide, and the product is a polymer obtained through the polymerization reaction. In reaction equation 1, the portion designated by dotted lines represents the epoxide. R and R' have a structure including one of the functional groups of an amide functional group (—NH—CO—), an ester functional group (—CO—O—), an ether functional group (—O—), a sulfide functional group (—S—), a sulfoxide functional group (—SOO—), a hydroxide functional group (—OH), a halide functional group (—F, —Cl, —Br, —I), an imide functional group (—CO—N—CO—), an aza functional group (—N—), an amine functional group (—NH$_2$—), an azo functional group (—N=N—), an aldehyde functional group (—CO—H), a carboxyl functional group (—CO—), an anhydride functional group (—CO—O—CO—) and an urea functional group (—NH—CO—NH—).

In particular, one of a chemically stable amide functional group (—NH—CO—), ester functional group (—CO—O—), ether functional group (—O—), sulfide functional group (—S—), or carboxyl functional group (—CO—) is preferred.

As described above, when the first compound of the sealant pattern 300 and the second compound of the separator pattern 400 include the amine-based compound and the epoxy-based compound, respectively, the first and second compounds chemically react according to the chemical reaction of an amine and an epoxide as follows.

When the first compound is represented by chemical formula 1, the chemical reaction of the first and the second compounds is represented by the following reaction equation 2.

<Reaction equation 2>

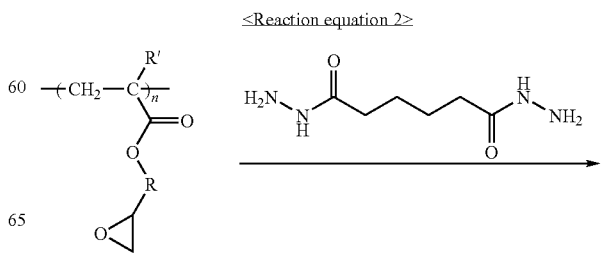

-continued

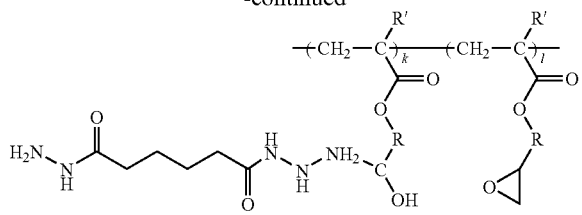

1 ≤ k ≤ n, k + l = n, k is a positive integer
n is a positive integer
R, R': —NH—CO—, —CO—O—, —O—, —S—,
—SOO—, —OH, —F, —Cl, —BR, —I,
—CO—N—CO—, —N—, —NR, —N=N—,
—CO—H, —CO—, —CO—O—CO—,
—NH—CO—NH—

When the first compounds is represented by chemical formula 2, the chemical reaction of the first and the second compounds is represented by the following reaction equation

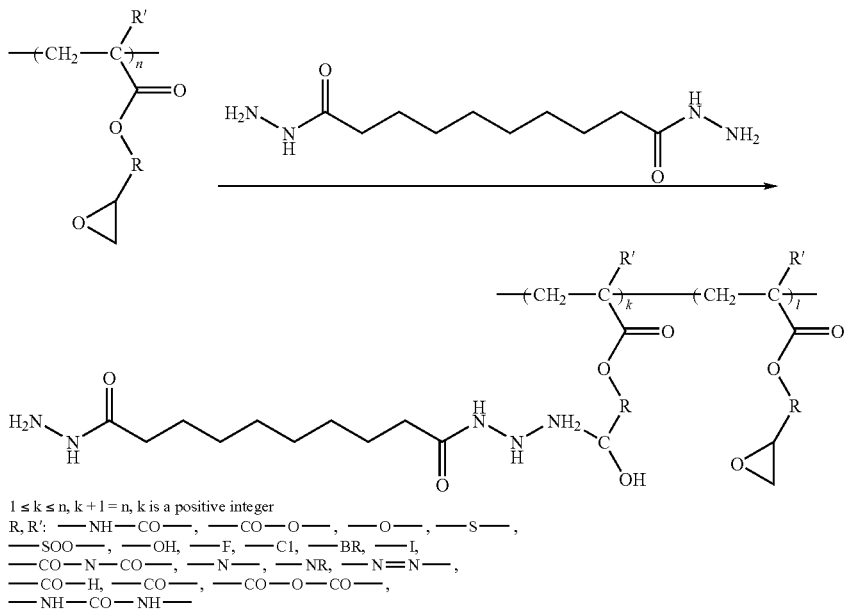

≤Reaction equation 3≥

1 ≤ k ≤ n, k + l = n, k is a positive integer
R, R': —NH—CO—, —CO—O—, —O—, —S—,
—SOO—, —OH, —F, —Cl, —BR, —I,
—CO—N—CO—, —N—, —NR, —N=N—,
—CO—H, —CO—, —CO—O—CO—,
—NH—CO—NH—

As illustrated in reaction equation 2 and reaction equation 3, a portion or the entire epoxy-based second compound may combine with the amine-based first compound. In reaction equations 2 and 3, a portion (k) of the individual molecules (n) constituting the second polymer compound reacts with the first compound, and the remaining portion (l) thereof does not react with the first compound. The portion of the second compound that reacts with the first compound does not need to continuously be neighboring the first compound. A portion or all of a neighboring portion reacts with the first compound.

During the reaction, the structure of the second compound changes from a cyclic shape to a chain shape, and one hydrogen included in the amine of the first compound combines with oxygen included in the epoxy-based second compound.

Through the above described chemical reaction, the first compound and the second compound combine and may prevent diffusion of the compounds into the display area DA. As illustrated in the reaction equations 2 and 3, since no additional product is generated, there is no contamination of the liquid crystal from an additional product of the chemical reaction Therefore, the contamination of the liquid crystal within the display area DA may be prevented by physically and chemically blocking the contaminating materials from the sealant pattern 300 by means of the separator pattern 400, thereby improving the quality of the image of the liquid crystal display device.

FIG. 2 is a schematic planar view of FIG. 1. Referring to FIG. 2, the liquid crystal display device includes a first substrate 100 and a second substrate 200 facing each other and a display area DA defined on the first substrate 100. A sealant pattern 300 is formed along the edge portion of the first substrate 100 forming a closed loop. A separator pattern 400 is formed between the display area DA and the sealant pattern 300. The separator pattern 400 forms a closed loop within the sealant pattern 300, and the contaminating materials (designated by arrows) from the sealant pattern 300 are blocked by the separator pattern 400 to prevent the diffusion of the contaminating materials into the display area DA.

Figure 3:
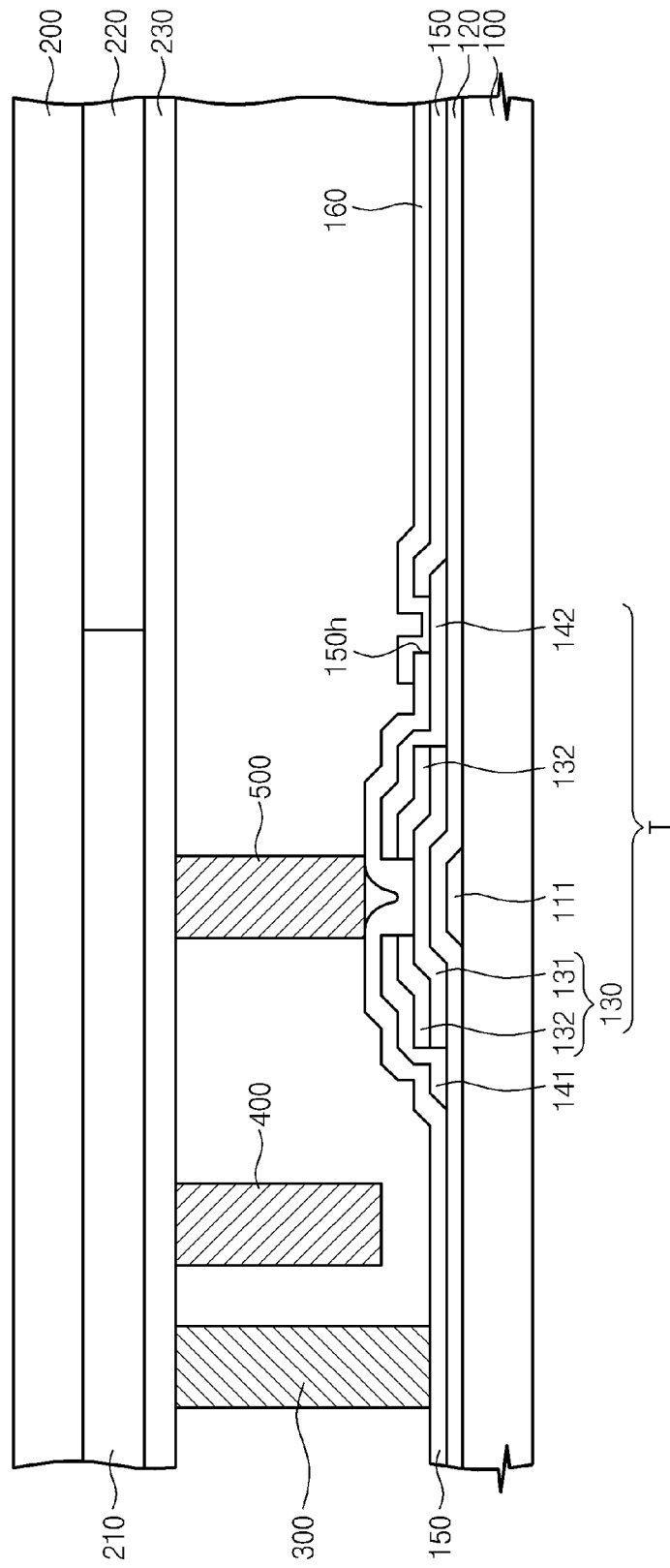
FIG. 3 is a cross-sectional view taken along line I-I' of FIG. 2.

FIG. 3 is a cross-sectional view taken along line I-I' of FIG. 2.

Referring to FIG. 3, a gate electrode 111 of a thin film transistor T is formed on a predetermined region of the first substrate 100. A gate insulating layer 120 is formed on the gate electrode 111 to substantially cover the entire surface of the first substrate 100. A semiconductor pattern 130 is formed on the gate insulating layer 120 and overlapping the gate electrode 111. A source electrode 141 and a drain electrode 142 are formed facing each other on the semiconductor pattern 130. The semiconductor pattern 130 includes an active pattern 131 and an ohmic contact pattern 132. The active pattern 131 forms a channel during the operation of the thin film transistor T, and the ohmic contact pattern 132 is separated along the source electrode 141 and the drain electrode 142.

A passivation layer 150 is formed on the thin film transistor T to substantially cover the entire surface of the first substrate 100. A pixel electrode 160 is formed on the passivation layer 150. A contact hole 150h is formed in the passivation layer 150 to expose the drain electrode 142. The pixel electrode 160 is electrically connected to the drain electrode 142 through the contact hole 150h.

A light shielding layer pattern 210 and a color filter 220 are formed on the second substrate 200. The color filter 220 is formed at the region corresponding to the pixel area PA. The color filter 220 may be a red color filter, green color filter, or blue color filter, which are the three primary colors of light, in order to display a color image. The light shielding layer pattern 210 shields the transmission of light at the exterior region of the pixel area PA. A common electrode 230 is formed on the light shielding layer pattern 210 and the color filter 220 to face the pixel electrode 160. A spacer 500 is formed on the common electrode 230 to keep a predetermined distance between the first substrate 100 and the second substrate 200.

A sealant pattern 300 and a separator pattern 400 are arranged at the edge portion of the first substrate 100 and the second substrate 200. The sealant pattern 300 is formed on the first substrate 100 and the upper surface portion thereof contacts the second substrate 200. The separator pattern 400 is formed on the second substrate 200 and the lower portion thereof is separated from the first substrate 100. The separator pattern 400 may be formed on the first substrate 100 and the upper portion thereof is separated from the second substrate 200. Through the separated portion, the contaminating materials generated from the sealant pattern may be permitted to move, however, the diffusion of the contaminating materials into the display area DA is blocked because of a chemical reaction with a compound included in the separator pattern 400. If the gap between the separator pattern 400 and the first substrate 100 is too large, the contaminating materials may diffuse into the display area DA in spite of the chemical blocking by the separator pattern 400. Therefore the gap between the separator pattern 400 and the first substrate 100 is required to have an upper limit, preferably the gap may be about 10% or less of the distance between the first substrate 100 and the second substrate 200.

Figure 4:
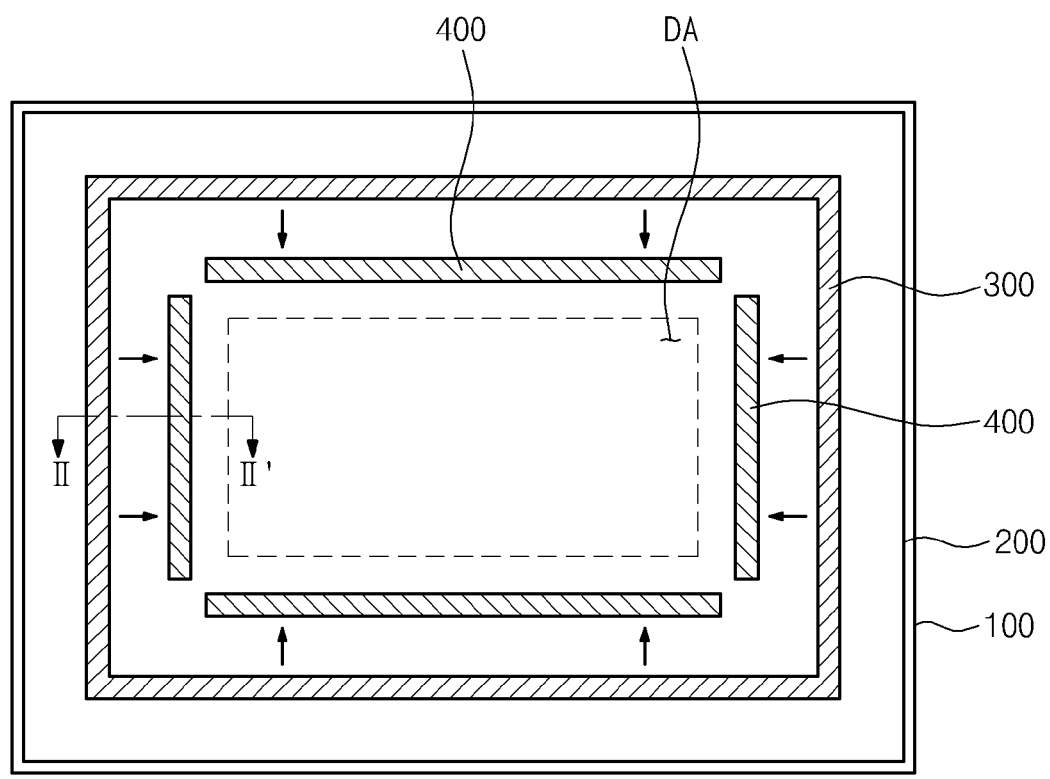
FIG. 4 is a schematic planar view of a liquid crystal display device according to another exemplary embodiment of the present invention.

FIG. 4 is a schematic planar view of a liquid crystal display device according to another exemplary embodiment of the present invention. The detailed description of the common portion with the previous explanation will be omitted in the following description.

Referring to FIG. 4, a first substrate 100 on which a display area DA is defined and a second substrate 200 facing the first substrate 100 are provided, and a sealant pattern 300 is formed along the edge portion of the first substrate 100. A separator pattern 400 is formed between the display area DA and the sealant pattern 300 to block the contaminating material (designated by arrows).

The sealant pattern 300 seals the space between the first substrate 100 and the second substrate 200 and forms a closed loop to receive the liquid crystal therein. The separator pattern 400 corresponds to the sealant pattern 300, however, the separator pattern 400 does not form a closed loop. Accordingly, separator pattern 400 may include discrete segments positioned to form a rectangular shape. The contaminating material (designated by arrows) from the sealant pattern 300 is blocked by the separator pattern 400 and does not diffuse into the display area DA. At the opened portion between two segments of the separator pattern 400, the contact area of the contaminating material with the separator pattern 400 increases and thus the rate of the chemical reaction to prevent the diffusion of the contaminating material increases.

Figure 5:
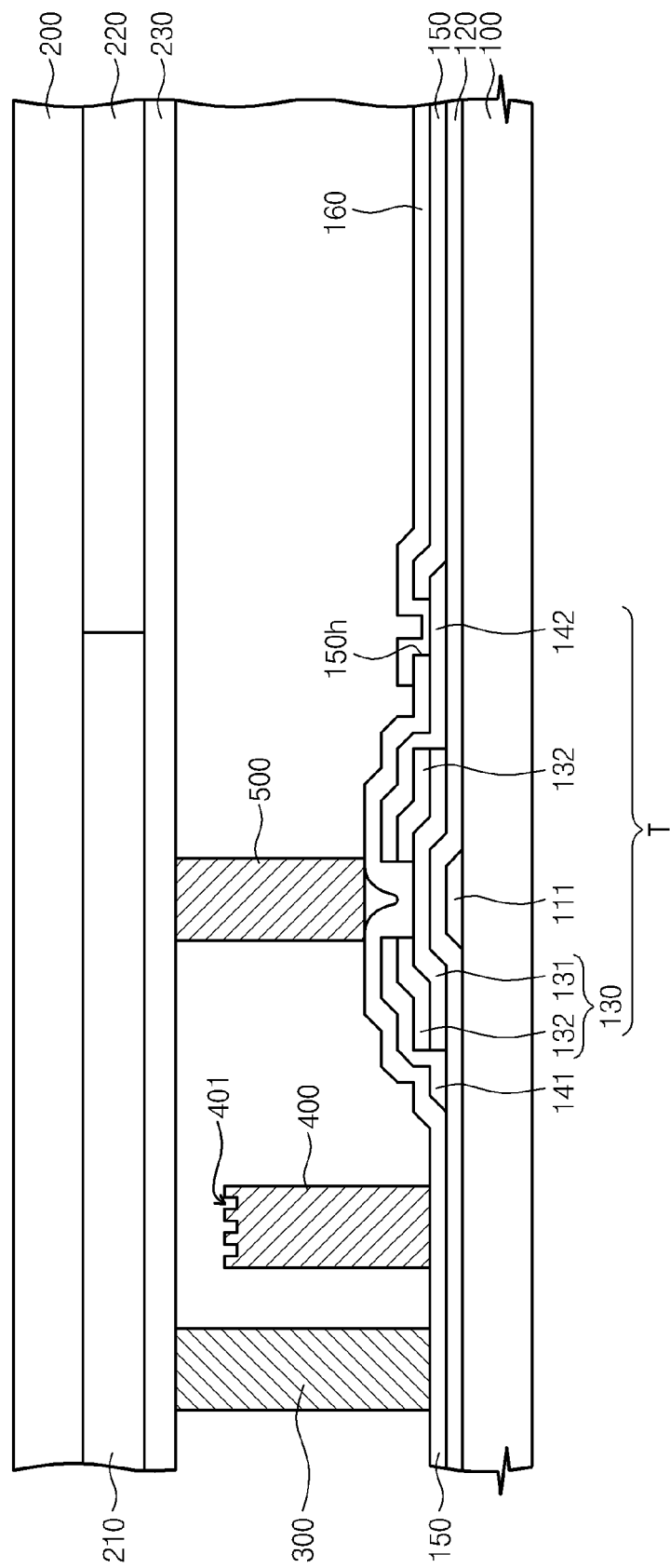
FIG. 5 is a cross-sectional view taken along line II-II' of FIG. 4.

FIG. 5 is a cross-sectional view taken along line II-II' in FIG. 4.

Referring to FIG. 5, a gate electrode 111 of a thin film transistor T, a gate insulating layer 120, a semiconductor pattern 130, a source electrode 141, a drain electrode 142, a passivation layer 150, and a pixel electrode 160 are formed on the first substrate 100.

A light shielding layer pattern 210, a color filter 220, a common electrode 230, and a spacer 500 are formed on the second substrate 200.

The sealant pattern 300 and the separator pattern 400 are formed at the edge portion of the first substrate 100 and the second substrate 200. The sealant pattern 300 is formed on the first substrate 100, and the upper surface portion thereof contacts the second substrate 200. The separator pattern 400 is formed on the first substrate 100, and the upper surface portion thereof is separated from the second substrate 200. The separator pattern 400 may be formed on the second substrate 200, and the lower surface portion thereof is separated from the first substrate 100. The gap between the separator pattern 400 and the second substrate 200 may be about 10% or less of the distance between the first substrate 100 and the second substrate 200.

A concavo-convex shape 401 is formed on the upper surface portion of the separator pattern 400. The surface area of the upper surface portion of the separator pattern 400 increases due to the concavo-convex shape 401. Due to the increased surface area, the contact area of the contaminating material from the sealant pattern 300 with the separator pattern 400 increases. As a result, the rate of the chemical reaction to effectively prevent the diffusion of the contaminating material increases. In order to further increase the contact area of the contaminating material with the separator pattern 400, the concavo-convex shape 401 also can be formed at the side surface of the separator pattern 400 that faces the sealing pattern 300.

FIG. 6A, FIG. 6B, FIG. 6C, FIG. 6D, FIG. 6E, and FIG. 6F are cross-sectional views showing a manufacturing process of the liquid crystal display device of FIG. 3.

Referring to FIG. 6A, the light shielding layer pattern 210 and the color filter 220 are formed on the second substrate 200. The light shielding layer pattern 210 may be formed by coating a light shielding layer including a photoresist component on the second substrate 200 and then patterning the light shielding layer. The patterning is formed during an exposing and a developing process. The light shielding layer coated at the region corresponding to the pixel area is removed by the developing process.

The color filter 220 may be formed by coating a color photoresist layer on the second substrate 200 and then patterning the coated color photoresist layer. The color filter 220 fills the removed area of the light shielding layer that is removed at the patterning of the light shielding layer. The patterning with respect to the color photoresist layer is implemented three times for the red/green/blue color filters.

Referring to FIG. 6B, the common electrode 230 is formed on the color filter 220. The common electrode 230 may be formed by depositing a transparent conductive layer of indium zinc oxide (IZO) or indium tin oxide (ITO) on the color filter 220. An over coating layer (not shown) can be additionally formed between the color filter 220 and the common electrode 230 to planarize the surface of the second substrate 200, if needed.

Referring to FIG. 6C, a material layer 450 including a photoresist component is coated on the common electrode 230. The material layer 450 may include a polymer obtained by polymerizing acryl monomers having an epoxide. The polymer can be represented by the following chemical formula 3 as described above in reaction equation 1.

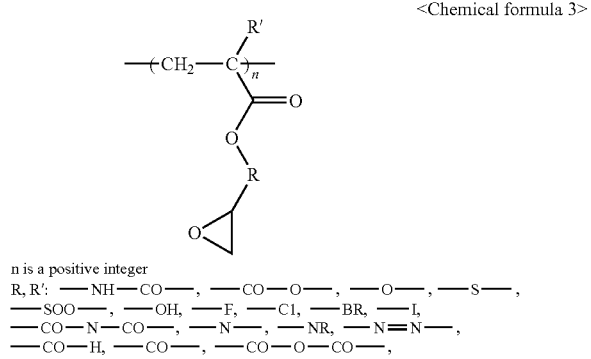

<Chemical formula 3> n is a positive integer
R, R': —NH—CO—, —CO—O—, —O—, —S—,
—SOO—, —OH, —F, —Cl, —BR, —I,
—CO—N—CO—, —N—, —NR, —N=N—,
—CO—H, —CO—, —CO—O—CO—,
—NH—CO—NH—

Next, an exposing process with respect to the material layer 450 is implemented. During the exposing process, a photo mask 600 exposing a predetermined region of the material layer 450 is utilized. The photo mask 600 includes a light transmitting region 610 and a light shielding region 620.

Referring to FIG. 6D, a developing process for the exposed material layer 450 is described. When the material layer 450 includes a negative-type photoresist component, an unexposed portion is removed during the exposing process. On the contrary, when the material layer 450 includes a positive-type photoresist component, an exposed portion is removed during the exposing process. In FIG. 6D, the material layer 450 is formed by using the negative-type component. Through the developing process, the material layer 450 is patterned to simultaneously form the separator pattern 400 and the spacer 500.

Figure 6E:
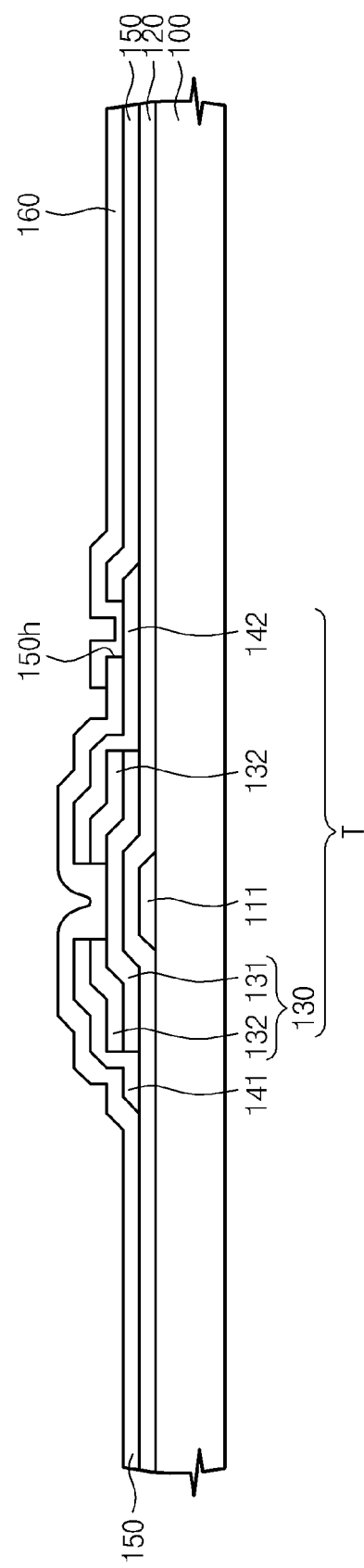

Referring to FIG. 6E a process for the first substrate 100 is carried out apart from the process for the second substrate 200. On the first substrate 100, a thin film transistor T including a gate electrode 111, a semiconductor pattern 130, a source electrode 141, and a drain electrode 142 is formed. On the thin film transistor T, a passivation layer 150 is formed. On the passivation layer 150, a pixel electrode 160 is formed.

Figure 6F:
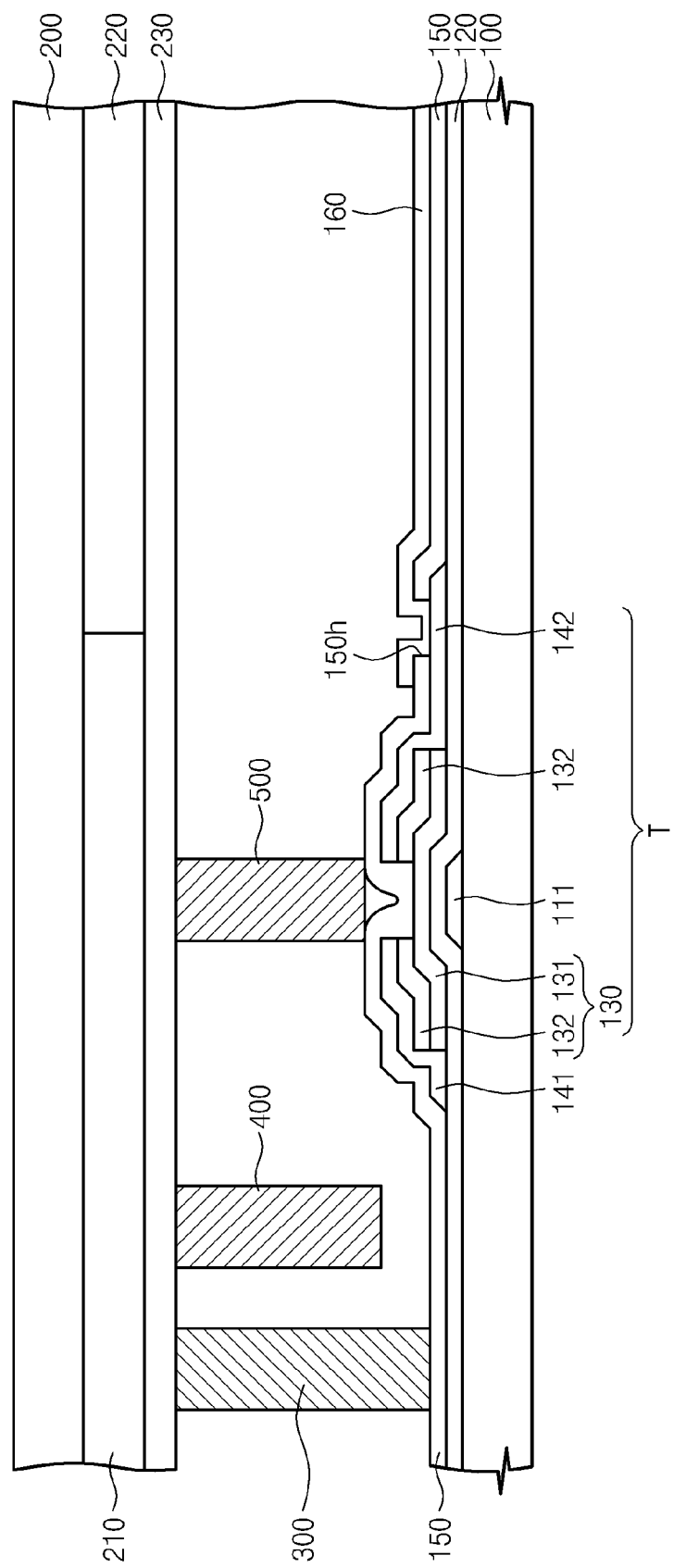

Referring to FIG. 6F, a sealant pattern 300 is arranged at the edge portion of the first substrate 100. The first substrate 100 and the second substrate 200 are arranged to face each other. When the sealant pattern 300 is cured by heat or light and the first substrate 100 and the second substrate 200 are attached together, the manufacture of the liquid crystal display panel is completed.

Through the above described process, a separator pattern 400 and a spacer 500 are formed simultaneously. Therefore, a separate process to form the separator pattern 400 can be omitted to improve process efficiency.

FIG. 7A, FIG. 7B, FIG. 7C, and FIG. 7D are cross-sectional views showing a manufacturing process of the liquid crystal display device of FIG. 5.

Figure 7A:
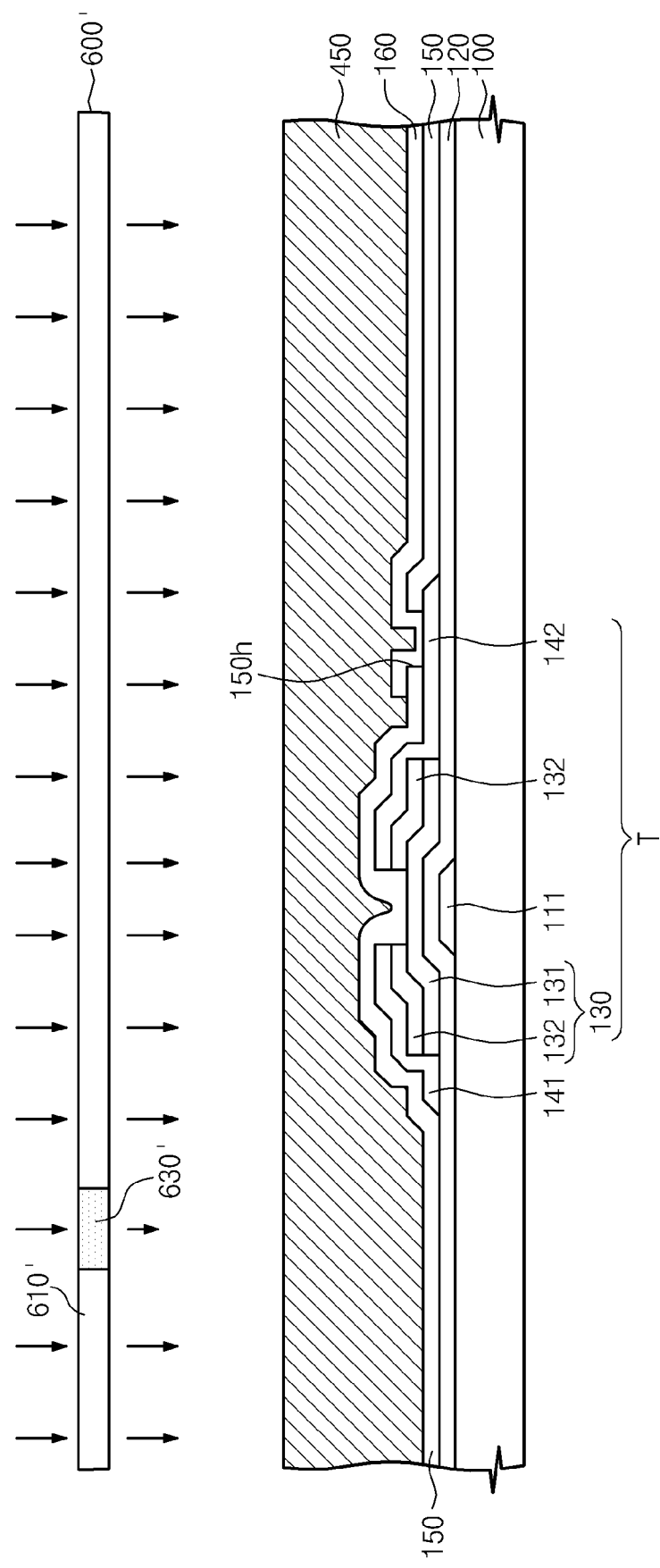
FIG. 7A, FIG. 7B, FIG. 7C, and FIG. 7D are cross-sectional views showing a manufacturing process of the liquid crystal display device of FIG. 5.

Referring to FIG. 7A, the thin film transistor T including the gate electrode 111, the semiconductor pattern 130, the source electrode 141, and the drain electrode 142 is formed on the first substrate 100. The passivation layer 150 is formed on the thin film transistor T, and the pixel electrode 160 is formed on the passivation layer 150.

On the whole surface of the first substrate 100, a material layer 450 is formed to cover the passivation layer 150 and the pixel electrode 160. The material layer 450 may include a polymer material obtained by polymerizing acryl monomers having an epoxide and represented by chemical formula 3.

An exposing process with respect to the material layer 450 is the carried out. A photo mask 600' is used during the exposing process, and the photo mask 600' includes a light transmitting region 610' and a semi-light transmitting region 630'. At the semi-light transmitting region 630' a portion of the light transmits through the semi-light transmitting region 630' according to the positions of the corresponding region of the material layer 450. As the photo mask 600', a half tone mask or a slit mask may be used.

Figure 7B:
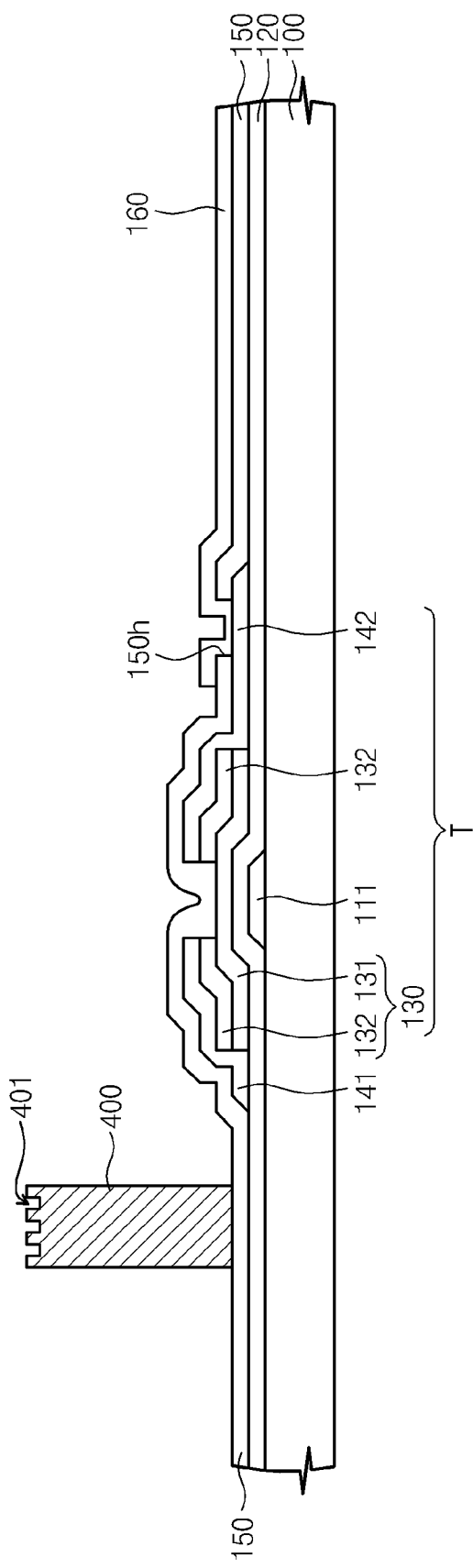

FIG. 7B shows a developing process with respect to the exposed material layer 450 is described. In the material layer 450, a positive type or a negative type photoresist component is included. As illustrated in FIG. 7B, when the photoresist is the positive type, the completely exposed portion is removed, and a separator pattern 400 is formed by the remaining portion. The remaining portion of the material layer 450 is partially exposed by the semi-light transmitting region 630'. As a result, a concavo-convex shape 401 is formed.

The concavo-convex shape can be formed at the side surface of the separator pattern 400 as well as on the upper surface thereof. After patterning the material layer 450 and forming the separator pattern 400, the side portion may be formed into the concavo-convex shape.

Figure 7C:
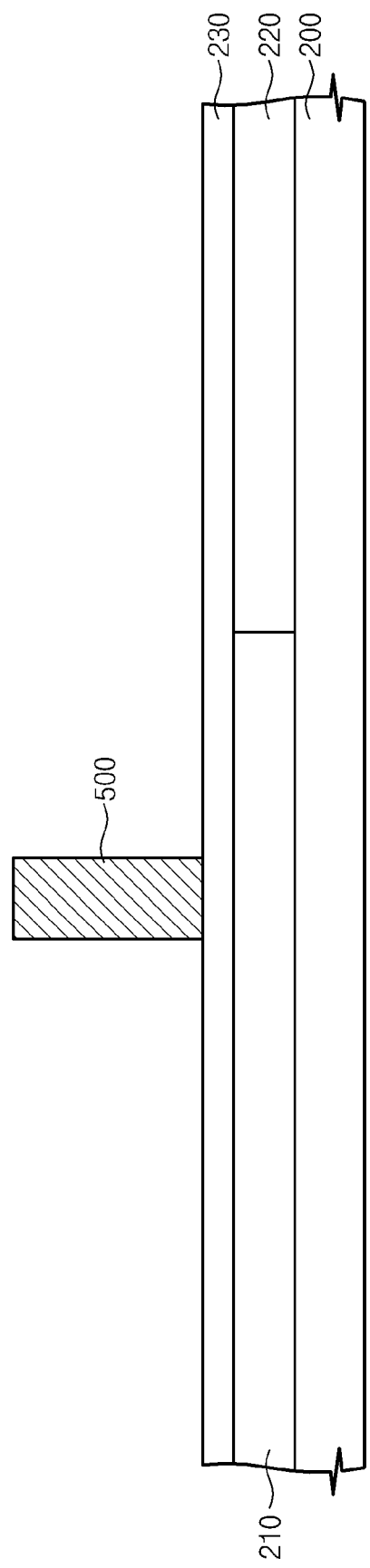

Referring to FIG. 7C, a light shielding layer pattern 210, a color filter 220, a common electrode 230, and a spacer 500 are formed on the second substrate 200.

Figure 7D:
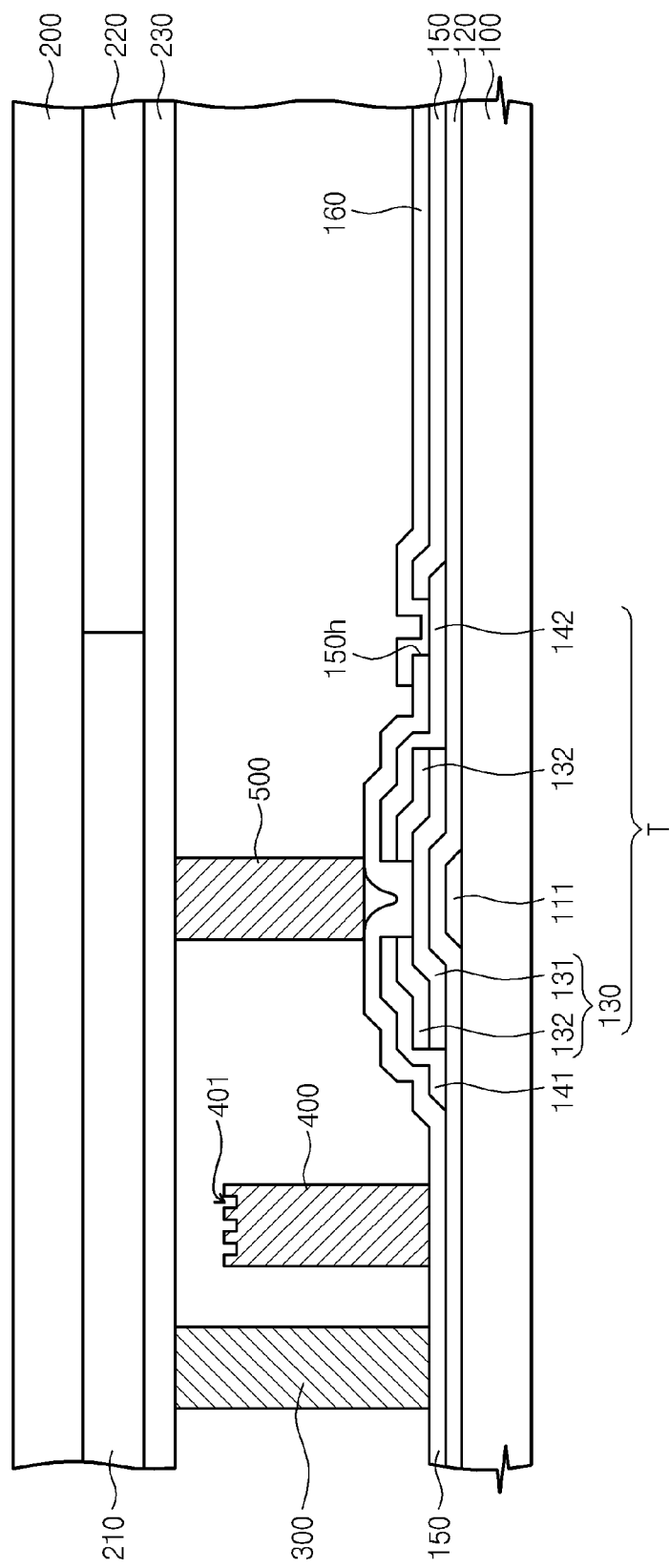

Referring to FIG. 7D, a sealant pattern 300 is coated at the edge portion of the first substrate 100, and the first substrate 100 and the second substrate 200 are arranged so that they face each other. The sealant pattern 300 is cured by heat or light, and the first substrate 100 and the second substrate 200 are coupled together to complete the manufacturing of the liquid crystal display panel.

According to the above-described process, the spacer 500 and the separator pattern 400 are separately formed using different materials. At this time, the spacer 500 can be formed by using a material having a high elasticity so that the spacer 500 has elasticity, and the distance between the first substrate 100 and the second substrate 200 may be maintained.

As described above, since the separator pattern is formed using a material having a chemical reactivity with the sealant pattern, the separator pattern blocks the contaminating material physically and chemically, thereby providing a display device that may have high quality images.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed:
1. A display device, comprising:
a first substrate comprising a display area;
a second substrate facing the first substrate;
a sealant pattern arranged on one of the first substrate and the second substrate and outside the display area, the sealant pattern comprising a first compound; and
a separator pattern arranged on one of the first substrate and the second substrate and between the sealant pattern and the display area, the separator pattern comprising a second compound represented by formula:

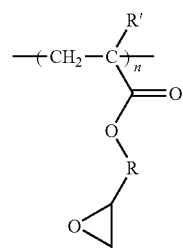

wherein n is a positive integer, wherein R is one of —NH—CO—, —CO—O—, —O—, —S—, —SOO—, —CO—N—CO—, —N—, —N=N—, —CO—, —CO—O—CO—, and —NH—CO—NH—, and wherein R' is one of —OH, —F, —Cl, —Br, —I, and —CO—H to chemically react with the first compound to prevent diffusion of the first compound into the display area.

2. The display device of claim 1, wherein the first compound comprises the following chemical formula:

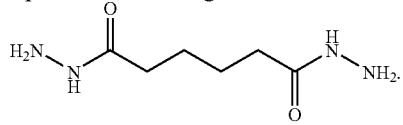

3. The display device of claim 2, wherein the separator pattern comprises the following compound produced through a chemical reaction of the first compound and second compound:

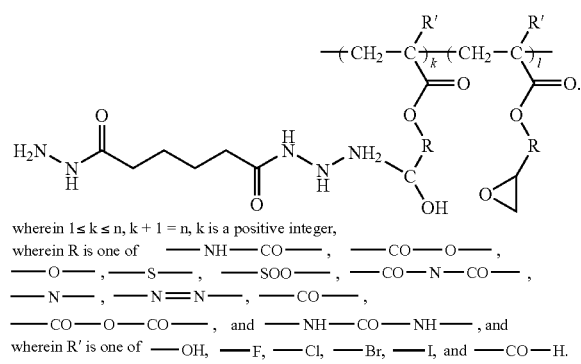

wherein $1 \le k \le n$, $k + 1 = n$, k is a positive integer,
wherein R is one of —NH—CO—, —CO—O—,
—O—, —S—, —SOO—, —CO—N—CO—,
—N—, —N=N—, —CO—,
—CO—O—CO—, and —NH—CO—NH—, and
wherein R' is one of —OH, —F, —Cl, —Br, —I, and —CO—H.

4. The display device of claim 1, wherein the first compound comprises the following chemical formula.

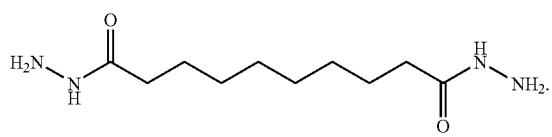

5. The display device of claim 4, wherein the separator pattern comprises the following compound produced through a chemical reaction of the first compound and second compound:

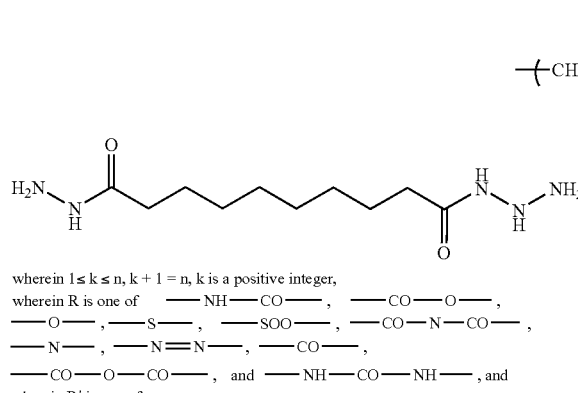
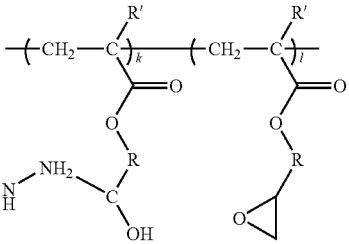

wherein $1 \le k \le n$, $k + 1 = n$, k is a positive integer,
wherein R is one of —NH—CO—, —CO—O—,
—O—, —S—, —SOO—, —CO—N—CO—,
—N—, —N=N—, —CO—,
—CO—O—CO—, and —NH—CO—NH—, and
wherein R' is one of —OH, —F, —Cl, —Br, —I, and —CO—H.

6. The display device of claim 1, wherein a surface of the separator pattern comprises a concave-convex shape.

7. The display device of claim 6, wherein the separator pattern is formed through an exposing process and the concave-convex shape is obtained by controlling an exposing amount within a corresponding region during the exposing process.

8. The display device of claim 1, wherein the separator pattern has a thickness less than a distance between the first substrate and the second substrate.

9. The display device of claim 1, wherein the separator pattern has a shape corresponding to the sealant pattern.

10. The display device of claim 1, further comprising a spacer formed on one of the first substrate and the second substrate to keep a distance between the first substrate and the second substrate.

11. The display device of claim 10, wherein the separator pattern and the spacer comprise using the same material.

12. The display device of claim 10, wherein the separator pattern and the spacer are formed at the same time through the same process.

13. The display device of claim 1, wherein the separator pattern is arranged on the first substrate without contacting the second substrate, and a gap between the separator pattern and the second substrate is equal to 10% or less of the distance between the first substrate and the second substrate.

14. The display device of claim 1, wherein the separator pattern is arranged on the second substrate without contacting the first substrate, and a gap between the separator pattern and the first substrate is equal to 10% or less of the distance between the first substrate and the second substrate.

* * * * *